United States Patent
Zhang et al.

(10) Patent No.: US 11,905,378 B2
(45) Date of Patent: Feb. 20, 2024

(54) HIGH-GRAFTING DENSITY CYCLIC COMB SHAPED POLYMER AND PREPARATION METHOD THEREFOR

(71) Applicant: SOOCHOW UNIVERSITY, Suzhou (CN)

(72) Inventors: Wei Zhang, Suzhou (CN); Shuangshuang Zhang, Suzhou (CN); Jieai Li, Suzhou (CN); Xiulin Zhu, Suzhou (CN); Zhengbiao Zhang, Suzhou (CN); Nianchen Zhou, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 612 days.

(21) Appl. No.: 17/140,550

(22) Filed: Jan. 4, 2021

(65) Prior Publication Data
US 2021/0122883 A1  Apr. 29, 2021

Related U.S. Application Data

(63) Continuation of application No. PCT/CN2018/094576, filed on Jul. 4, 2018.

(51) Int. Cl.
| | | |
|---|---|---|
| *C08F 2/46* | (2006.01) | |
| *C08F 2/50* | (2006.01) | |
| *C08G 61/04* | (2006.01) | |
| *C08G 81/02* | (2006.01) | |

(52) U.S. Cl.
CPC ................... *C08G 81/024* (2013.01)

(58) Field of Classification Search
CPC .............. C08G 81/00; C08G 81/024
USPC .......................... 522/111, 1; 520/1
See application file for complete search history.

(56) References Cited

FOREIGN PATENT DOCUMENTS

| CN | 103772714 A | 5/2014 | |
|---|---|---|---|
| WO | WO-2018137507 A1 * | 8/2018 | ............. C08G 79/08 |

OTHER PUBLICATIONS

Liang et al., WO 2018137507 Machine Translation, Jan. 25, 2017 (Year: 2017).*
Zhang et al. "Synthesis and Thermoresponsive Behaviors of Thermo- , pH- , CO2- , and Oxidation-Responsive Linear and Cyclic Graft Copolymers" Macromolecules, 2017, 50, 3411-3423 (Apr. 6, 2017).
Zhu et al. "Cyclic Polymer with Alternating Monomer Sequence" Macromol. Rapid Commun. 2015, 36, 1987-1993 (Dec. 31, 2015).
An et al. "Synthesis, Thermal Properties, and Thermoresponsive Behaviors of Cyclic Poly(2-(dimethylamino)ethyl Methacrylate)s" Macromol. Rapid Commun. 2016, 37 980-986.

* cited by examiner

*Primary Examiner* — Jessica Whiteley
(74) *Attorney, Agent, or Firm* — SZDC Law PC (57) ABSTRACT

A high-grafting density cyclic comb shaped polymer and its preparation method therefor. The method comprises the following steps: 1) synthesizing linear poly(pentafluorophenyl 4-vinylbenzoate) (1-PPF4VB$_{4.0k}$); 2) performing photo-induced cyclization on the linear polymer to prepare the cyclic polymer (c-PPF4VB$_{4.0k}$); 3) performing post modification on the cyclic polymer c-PPF4VB$_{4.0k}$ by using small molecules to prepare a functionalized cyclic polymer (c-P1); 4) then performing polymer post modification on the cyclic polymer (c-P1) by using an efficient click reaction to construct the high-grafting density cyclic comb shaped polymer (c-P1-g-PS); and 5) directly performing polymer post modification on the cyclic polymer c-PPF4VB$_{4.0k}$ by using macromolecules to construct a high-grafting density cyclic comb shaped polymer (c-PPF4VB$_{4.0k}$-g-PEG), the obtained cyclic comb shaped polymer still remaining the characteristic of a narrow molecular weight distribution.

12 Claims, 5 Drawing Sheets

HIGH-GRAFTING DENSITY CYCLIC COMB SHAPED POLYMER AND PREPARATION METHOD THEREFOR

This application is a Continuation Application of PCT/CN2018/094576, filed on Jul. 4, 2018, which is incorporated by reference for all purposes as if fully set forth herein.

TECHNICAL FIELD

The invention belongs to the technical field of polymer synthesis and relates to high-grafting density cyclic comb shaped polymer and its preparation method therefore.

BACKGROUND TECHNIQUE

Comb polymers are a class of worm-like topological macromolecular structures with one main backbone and multiple grafted side chains. The polymer properties can be adjusted by changing the number, type, and length of grafts. It is favored in the fields of drug delivery, biosensors, lubricants, nanowires, and nanotubes. The existing synthesis methods are mainly divided into the following three categories: (1) "grafting through", in short, using macromolecules as monomers to directly polymerize to form comb polymers; (2) "grafting from", specifically It is to establish multiple sites that can initiate polymerization on the backbone skeleton, and then use "living"/controlled radical polymerization, ring-opening polymerization and other techniques to "elongate" multiple side chains from the backbone skeleton, thereby Generate comb-like polymers; (3) "grafting onto", that is, first synthesizing the backbone skeleton and the side chain polymer separately, and then modifying the grafted side chain by "Click" and other efficient chemical reactions, Thereby, a comb polymer is produced.

"Grafting onto" methods have certain adjustable properties in the process of preparing comb polymers, because the backbone and side chains are synthesized and characterized separately. However, the graft density is often determined by the efficiency of the chemical reaction between the side chain and the backbone backbone. In order to increase the graft density, a series of efficient chemical reactions and supramolecular assembly methods are used to construct comb polymers, such as: copper-catalyzed azide/alkynyl cycloaddition (CuAAC), thiol-double bond coupling, Diels-Alder reaction, substitution reaction of active ester with amine, electrostatic self-assembly-covalent fixation (ESA-CF).

Comb polymers can be divided into linear, ring, star, bottle, dendritic and other comb polymers according to different frameworks. A ring-comb polymer, as a type of comb-like topology, has a ring-shaped backbone structure and a plurality of grafted side chains. As we all know, cyclic polymers show many excellent properties compared to their linear precursors due to the absence of terminal groups, such as: smaller hydrodynamic size, lower intrinsic viscosity, higher density, higher Glass transition temperature, etc., has been well applied in biomedicine, materials science and other fields. Comb-ring polymers, combining the properties of comb-shaped and cyclic polymers, obviously the polymer field has become a class of topological structures with great potential, with certain research value and potential applications.

Technical Problem

In view of the above, the present invention uses a small molecule amine to post-modify a functionalized cyclic polymer on the cyclic polymer main chain, and then the polymer chain is post-modified to a functionalized cyclic by an efficient reaction. The polymer is on the main chain of the polymer to build a ring-comb polymer. The polymer amine can also be used to directly modify the polymer to create a ring-comb polymer. The ring-comb polymer prepared by these two methods Both have the characteristics of high graft density.

Technical Solutions

In order to achieve the above objective, the present invention adopts the following technical solutions:
A preparation method of high-grafting density cyclic comb shaped polymer, which included the steps as follow,
Step 1 In the RAFT reagent, the formate monomer was as the raw material to prepare the linear polyformate in solvent;
Step 2 In the inert gas atmosphere and solvent, the cyclic polyformate was obtained by the linear polyformate through the light-induced reaction;
Step 3 In the inert gas atmosphere and solvent, the functional cyclic polymer was prepared by the cyclic polyformate reacted with the small molecule amine.
Step 4 In the inert gas atmosphere and solvent, and the presence of pentamethyldiethylenetriamine, copper, and copper salts, the functional cyclic polymer reacted with linear azide polystyrene to prepare the high-grafting density cyclic comb shaped polymer.

In the Step 1 of technical solution above, the molar ratio of the formate monomer to RAFT reagent was from (50 to 150):(1 to 2), preferably 100:1; the formate monomer was pentafluorophenyl 4-vinylphenylformate; toluene was the solvent; the reaction temperature was 80 to 120° C. for 4 to 10 hours.

In the Step 2 of technical solution above, the photoinduction was UV irradiation reaction for 6 to 24 hours, and the ultraviolet light was selected from one of low pressure mercury lamp mercury lamp, medium pressure mercury lamp, high pressure mercury lamp, preferably the low-pressure mercury lamp; the solvent was dichloromethane and acetonitrile, and the volume ratio of them was from (0 to 1):(2 to 4), preferably 1:3.

In the Step 3 of technical solution above, one of tetrahydrofuran, chloroform, and dichloromethane was selected as the solvent, preferably tetrahydrofuran; the molar ratio of cyclic polyformate to the small molecule amine was from (1 to 2):(40 to 80), preferably 1:60; the reaction was stirred at room temperature for 6 to 24 hours; the small molecule amine was propargylamine.

In the Step 4 of technical solution above, the molar ratio of the functional cyclic polymer, linear azide polystyrene, pentamethyldiethylenetriamine, copper, and copper salts was from (1 to 2):(20 to 40):(20 to 40):(10 to 20):(20 to 40), preferably 1:30:30:15; the solvent was THF and DMF, the volume ratio of them were from (2 to 4):(1 to 2), preferably 2:1; the copper salt was cuprous bromide.

In the technical solution above, the reaction of styrene, EBiB, $CuBr_2$, PMDETA, AA and anisole, was stirred at 90° C. for 2.5 hours to obtain the polymer; the polymer, sodium azide and DMF was mixed and stirred at room temperature for 24 hours to obtain linear azide polystyrene.

The invention also disclosed the other preparation method of high-grafting density cyclic comb shaped polymer, which included the steps as follow, Step 1 In the RAFT reagent, the formate monomer was as the raw material to prepare the linear polyformate in solvent;

Step 2 In the inert gas atmosphere and solvent, the cyclic polyformate was obtained by the linear polyformate through the light-induced reaction;

Step 3 In the inert gas atmosphere and solvent, the cyclic polyformate reacted with the amino-terminated polymer to prepare the high-grafting density cyclic comb shaped polymer.

In the Step 1 of technical solution above, the molar ratio of the formate monomer to RAFT reagent was from (50 to 150):(1 to 2), preferably 100:1; the formate monomer was pentafluorophenyl 4-vinylphenylformate; toluene was the solvent; the reaction temperature was 80 to 120° C. for 4 to 10 hours.

In the Step 2 of technical solution above, the photoinduction was UV irradiation reaction for 6 to 24 hours, and the ultraviolet light was selected from one of low pressure mercury lamp mercury lamp, medium pressure mercury lamp, high pressure mercury lamp, preferably the low-pressure mercury lamp; the solvent was dichloromethane and acetonitrile, and the volume ratio of them was from (0 to 1):(2 to 4), preferably 1:3.

In the Step 3 of technical solution above, the molar ratio of cyclic polyformate and the amino-terminated polymer was from 1 to 2:10 to 30, preferably 1:18; and the solvent was THF and DMF, the volume ratio of them were from 1 to 2:1 to 2, preferably 1:1; the amino-terminated polymer was PEG-$NH_2$.

The preparation method of high-grafting density cyclic comb shaped polymer of the invention can be expressed as follows, (1) Synthesis of linear poly (pentafluorophenyl 4-vinyl benzoate) with molecular weight of 3000 to 6000 g/mol (l-PPF4VB$_{4.0k}$): The monomer (pentafluorophenyl 4-vinylphenylformate), RAFT reagent, and toluene toluene were added to the reaction vessel. The reaction vessel was frozen-evacuated-thaw cycled by three times on the vacuum line, and reacted at form 80 to 120° C. for 4 to 10 hours, the linear polymer l-PPF4VB$_{4.0k}$ was obtained, in which the molar ratio between monomer and RAFT reagent was from 50 to 150:1 to 2;

(2) Preparation of cyclic polymers (c-PPF4VB$_{4.0k}$) by photo-induced cyclization of linear polymers:

Under an inert gas atmosphere, the polymer (l-PPF4VB$_{4.0k}$) and a mixed solvent (dichloromethane or acetonitrile) were added to the reaction solvent, and the solution was irradiated under ultraviolet light for 6 to 24 hours under stirring at room temperature to obtain a ring. Polymer (c-PPF4VB$_{4.0k}$), in which the volume ratio between the mixed solvent methylene chloride and acetonitrile was 0 to 1:2 to 4;

(3) Use small molecules to post-modify the cyclic polymer c-PPF4VB$_{4.0k}$ to prepare a functional cyclic polymer (c-P1):

Under an inert gas atmosphere, a cyclic polymer (c-PPF4VB$_{4.0k}$), propargylamine, and THF as a solvent were added to the reaction container, and the reaction solution was stirred at room temperature for 6 to 24 hours to obtain a functionalized cyclic polymer (c-P1), wherein the molar ratio between the polymer and the propargylamine was 1 to 2:40 to 80;

(4) The post-polymer modification of the cyclic polymer (c-P1) with high-efficiency reaction to construct a ring-comb polymer (c-P1-g-PS) with high graft density:

In an inert gas atmosphere, add cyclic polymer (c-P1), linear azide polystyrene (l-PS-$N_3$), PMDETA, and mixed solvent THF/DMF into the reaction vessel; then, in an inert gas atmosphere next, add cuprous bromide (CuBr) and trace copper powder to the reaction vessel; stir the reaction at room temperature for 12 to 48 hours to obtain a coarse ring-like comb polymer, and then use cycle preparation grade SEC to remove excess linear stack Nitrided polystyrene to obtain the final ring-shaped comb polymer (c-P1-g-PS) with high graft density, including cyclic polymer (c-P1), linear azide polystyrene (l-PS-$N_3$), PMDETA, molar ratio between Cu and CuBr 1 to 2:20 to 40:20 to 40:10 to 20:20 to 40, volume ratio between solvent THF and DMF 2 to 4:1 to 2.

or (5) Cyclic polymerc-PPF4VB$_{4.0k}$ was directly modified by macromolecules to construct a ring-comb polymer with high graft density (c-PPF4VB$_{4.0k}$-g-PEG):

Under the inert gas atmosphere, the cyclic polymer (c-PPF4VB$_{4.0k}$) PEG-$NH_2$, and the mixed solvent of THF/DMF were added to the reaction vessel. The reaction was stirred at room temperature for 12 to 48 hours to obtain the crude ring comb polymer (c-PPF4VB$_{4.0k}$-g-PEG), in which the molar ratio of cyclic polymer (c-PPF4VB$_{4.0k}$) and PEG-$NH_2$ was from 1 to 2:10 to 30, and the volume ratio between the solvent THF and DMF was 1 to 2:1 to 2.

In the present invention, the inert gas was selected from one of nitrogen, helium, and neon, and nitrogen was preferred.

In the present invention, 2,3-dimethylanisole, copper sulfate pentahydrate and potassium persulfate are used as raw materials, and the reaction is stirred in an acetonitrile/water mixed solvent to prepare 2-methoxy-6-methylbenzaldehyde; $AlCl_3$ is added to a solution of 2-methoxy-6-methylbenzaldehyde in dichloromethane and stir at room temperature overnight to obtain 2-hydroxy-6-methylbenzaldehyde; add 2-hydroxy-6-methylbenzaldehyde And bromopropanol were added to $K_2CO_3$ in DMF solution, and reacted at 90° C. overnight. After the reaction was completed, suction was filtered to remove insoluble matters. To the filtrate was added HCl solution to obtain 2-(3-hydroxypropoxy)-6-formaldehyde. Benzaldehyde; 2-(3-hydroxy-propoxy)-6-methylbenzaldehyde and 4-cyano-4-(thiobenzoylthio)valeric acid were dissolved in dichloromethane, and then dropped A dichloromethane solution containing N, N'-dicyclohexylcarbimide (DCC) and 4-dimethylaminopyridine (DMAP) was added and stirred at room temperature for 24 h to obtain a RAFT reagent.

In the method of the present invention, the substitution reaction between the active ester and the amine is used for the post-modification of the polymer. It is a relatively efficient chemical reaction. Compared with other synthetic methods, it can participate in the reaction of many types of amines and mild reaction conditions (such as: Room temperature, no catalyst), provides a very good synthetic approach for the synthesis of new functional polymer materials.

Beneficial Effect

Due to the implementation of the above technical solutions, the present invention has the following advantages over the prior art:

(1) For the first time, the present invention combines photo-induction and substitution reaction of an active ester with an amine to prepare a ring-comb polymer having a high graft density, and the obtained ring-comb polymer still maintains a narrow molecular weight distribution;

(2) The present invention uses a self-synthesized RAFT reagent and a monomer (pentafluorophenyl 4-vinyl benzoate) to perform RAFT polymerization under thermal polymerization conditions to synthesize a novel linear polymer (l-PPF4VB$_{4.0k}$). And no additional initiator (such as AIBN) is required in the thermal polymerization process, and the polymerization components only need monomers, RAFT reagents and solvents;

(3) The present invention uses a light-induced cyclization method to prepare a novel cyclic polymer (c-PPF4VB$_{4.0k}$), and then uses a small molecule amine to post-modify the cyclic polymer c-PPF4VB$_{4.0k}$ to prepare a functionalization. The cyclic polymer (c-P1) was analyzed from the NMR spectrum, and the modification efficiency reached to 100%;

(4) According to the present invention, a cyclic polymer (c-P1) is subjected to post-polymer modification through an efficient click reaction to construct a ring-comb polymer (c-P1-g-PS) with a high graft density, and is analyzed from a nuclear magnetic spectrum. Its grafting efficiency also reached to 100%.

EMBODIMENTS OF THE INVENTION

The present invention will be further described below with reference to specific embodiments and drawings.

Example 1: Synthesis of Linear Poly (Pentafluorophenyl 4-Vinyl Benzoate) (l-PPF4VB$_{4.0k}$)

Figure 1:
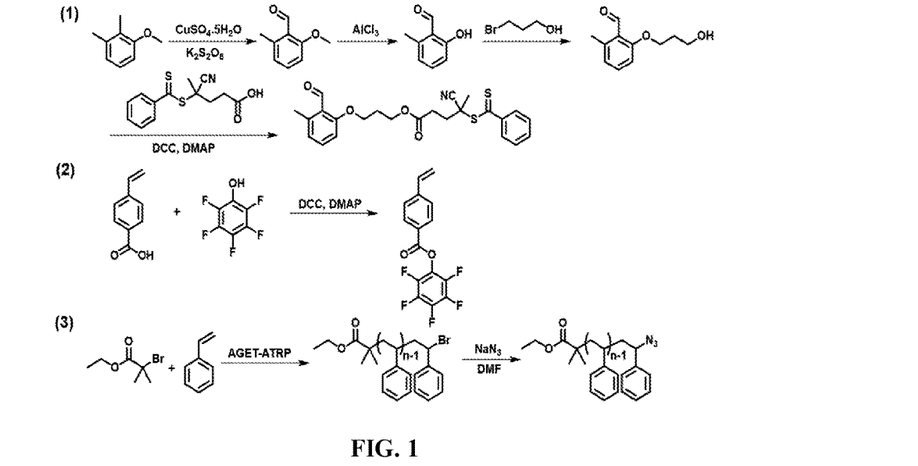
FIG. 1 is the synthetic route of RAFT reagents, monomers and linear polystyrene (l-PS-N$_3$)
Figure 2:
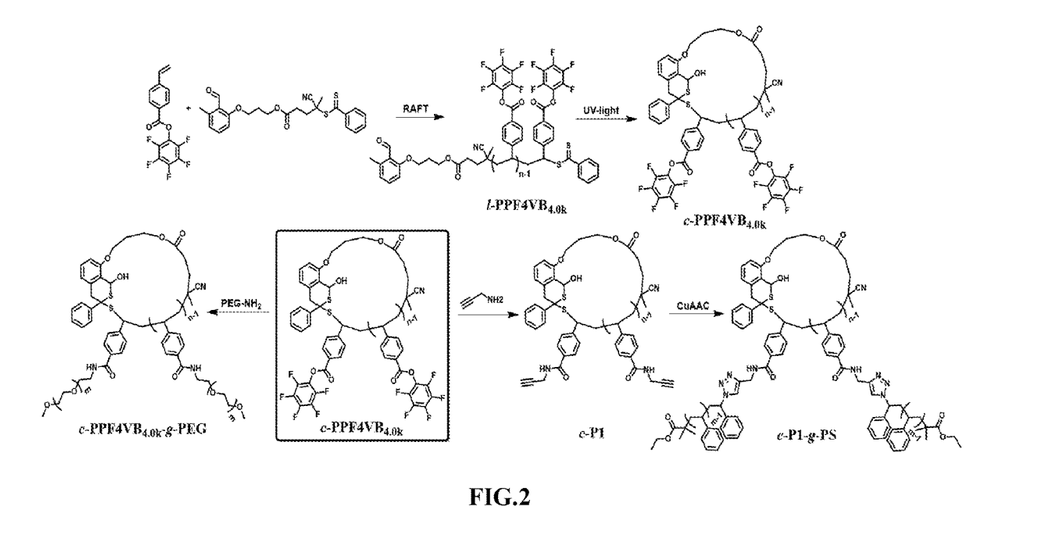
FIG. 2 is the synthetic route of the ring comb polymer (c-P1-g-PS, c-PPF4VB$_{4.0k}$-g-PEG)

The specific synthetic route of FIG. 1 and FIG. 2 shown are as follow.

2,3-Dimethylanisole (4.08 g, 30 mmol), copper sulfate pentahydrate (7.86 g, 31.5 mmol), potassium persulfate (24.33 g, 90 mmol) and acetonitrile/water (v/v, 1/1, 360 mL) mixed solvent was added to a 500 mL round bottom flask. The reaction was stirred in an oil bath at 90° C. until all the starting materials (2,3-dimethylanisole) were consumed by thin-layer chromatography, and the reaction was stopped. The reaction solution was extracted with dichloromethane, and the combined organic phases were dried over anhydrous magnesium sulfate. After suction filtration, the filtrate was concentrated by rotary evaporation, and then purified by silica gel column chromatography. The eluent was petroleum ether/ethyl acetate=6/1 (v/v). The final product, 2-methoxy-6-methylbenzaldehyde, was yellow solid (2.46 g, yield: 54.6%).

In 0° C. ice bath, 2-methoxy-6-methylbenzaldehyde (2.5 g, 10 mmol) was dissolved in dry dichloromethane (20 mL). AlCl$_3$ (4.0 g, 30 mmol) was added to the solution and stirred at room temperature overnight. The mixed solution was quenched with water. The reaction solution was extracted with dichloromethane (40 mL×3), and the combined organic phases were dried over anhydrous magnesium sulfate. After suction filtration, the filtrate was concentrated by rotary evaporation and purified by silica gel column chromatography. The eluent was petroleum ether/ethyl acetate=16/1 (v/v) to obtain 2-hydroxy-6-methylbenzaldehyde (1.22 g, Yield: 89.6%).

The obtained 2-hydroxy-6-methylbenzaldehyde (1 g, 7.34 mmol) and bromopropanol (1.02 g, 7.34 mmol) were added to the solution of K$_2$CO$_3$ (3.03 g, 22.02 mmol) in DMF (20 mL). The reaction solution was reacted at 90° C. overnight. After cooling to room temperature, the mixture was filtered with suction to remove insoluble matter, and amount of 1M solution of HCl was added to the filtrate. The mixture was extracted three more times with ethyl acetate and washed with saturated brine. The organic phase was dried over anhydrous magnesium sulfate, filtered with suction, and the filtrate was concentrated by rotary evaporation, and then purified by silica gel column chromatography. The eluent was petroleum ether/ethyl acetate=2/1 (v/v) to obtain 2-(3-hydroxypropoxy)-6-methylbenzaldehyde (0.72 g, yield: 50.5%).

The obtained 2-(3-hydroxypropoxy)-6-methylbenzaldehyde (358.1 mg, 1.84 mmol) and 4-cyano-4-(thiobenzoylthio) valeric acid (429.2 mg, 1.54 mmol) were dissolved in 5 mL of dichloromethane at 0° C. Then DCC (633.6 mg) and DMAP (37.54 mg, 0.31 mmol) were dissolved in 4 mL of dichloromethane and added dropwise to the above solution. After stirring at room temperature for 24 h, the reaction solution was filtered with suction to remove insoluble matter. The filtrate was concentrated by rotary evaporation using a rotary evaporator. The concentrated solution was purified by silica gel column chromatography. The eluent was petroleum ether/ethyl acetate=5/1 (v/v). The final product was a red oil, which was the RAFT reagent (497.8 mg, yield: 71.0%).

4-Vinylbenzoic acid (13.3 g, 90 mmol), 2,3,4,5,6-pentafluorophenol (14.7 g, 80 mmol) and DMAP (1.95 g, 16 mmol) were dissolved in 150 mL of THF. DCC was dissolved in THF and then added dropwise to the above reaction solution. The solution was stirred at room temperature for 24 hours. The mixture was filtered with suction to remove insolubles, and then quickly purified by silica gel column chromatography using eluent n-hexane. The obtained crude product was recrystallized from n-hexane at −20° C. to obtain the monomer pentafluorophenyl 4-vinylbenzoate. (13.24 g, Yield: 52.7%)

Pentafluorophenyl 4-vinyl benzoate (6.28 g, 20 mmol) and RAFT reagent (91.1 mg, 0.2 mmol) were dissolved in 10 mL of toluene. The polymer tube was cycled on the vacuum line for three cycles of freezing-exhausting-thawing and placed in an oil bath at 110° C. for 7 hours. The polymerization tube was unsealed after cooling with ice water, and then precipitated in 200 mL of n-hexane. The precipitated polymer was obtained by suction filtration and dried in a vacuum box at 30° C. for 24 hours to obtain linear poly (pentafluorophenyl 4-vinylbenzoate) (l-PPF4VB$_{4.0k}$, 789 mg, conversion rate: 12.4%), to avoid the influence of viscosity, to ensure a high degree of terminal functionality, that is, the integrity of the polymer.

Example 2: Preparation of a Cyclic Polymer (c-PPF4VB$_{4.0k}$) by Photo-Induced Cyclization of a Linear Polymer The specific synthetic route of FIG. 2 shown is as follow.

Under nitrogen atmosphere, the polymer (l-PPF4VB$_{4.0k}$, 15 mg, 15 mg) and dichloromethane (100 mL)/acetonitrile (300 mL) were added to a round bottom flask. At room temperature, the solution was exposed to light for 12 hours under UV light source. The solution was concentrated by rotary evaporation and precipitated in ice-n-hexane. The precipitated polymer was obtained by suction filtration and dried in vacuum box at 30° C. for 24 hours to obtain the cyclic polymer. (11.7 mg, yield: 78%), a low-pressure mercury lamp (120 W, CEL-LPH120-254) was used as light source for ultraviolet illumination.

Example 3: Post-Modification of Cyclic Polymer c-PPF4VB$_{4.0k}$ with Small Molecules to Prepare Functionalized Cyclic Polymer (c-P1)

The specific synthetic route of FIG. 2 shown is as follow.

Under nitrogen atmosphere, the cyclic polymer (c-PPF4VB4.0k) (50 mg, 1.25×10$^{-2}$ mmol), propargylamine (41.31 mg, 0.75 mmol), and THF (600 µL) were added into a 2 mL ampoule. The solution was stirred at room temperature for 12 hours. Then it was precipitated in n-hexane, and the precipitation was repeated for 3 times. The functionalized cyclic polymer (c-P1) was obtained by suction filtration and dried in a vacuum box at 30° C. for 24 hours (25.3 mg).

Example 4: Post-Polymer Modification of Cyclic Polymer (c-P1) to Construct a Ring-Comb Polymer (c-P1-g-PS) with High Graft Density The specific synthetic route of FIG. 1 and FIG. 2 shown are as follow.

Styrene (9.06 g, 87.00 mmol), EBiB (339.4 mg, 1.74 mmol), CuBr$_2$ (111.7 mg, 0.05 mmol), N,N,N',N'',N''-pentamethyldiethylenetriamine (PMDETA) (173.30 mg, 1.5 mmol), AA (176.13 mg, 1.0 mmol) and 10 mL of solvent anisole was added to a 25 mL schlenk bottle. The reaction solution was placed in an oil bath at 90° C. and stirred for 2.5 hours. The polymer was quickly cooled to room temperature, THF was dissolved and passed through short neutral alumina column, and then the solvent was concentrated by rotary evaporation. The polymer (l-PS-Br) was precipitated in methanol, obtained by suction filtration, and dried in a vacuum box at 30° C. for 24 hours (3.23 g, conv. %. 34.4%).

The polymer (l-PS-Br, 1.2 g, 0.5 mmol), NaN$_3$ (488.0 mg, 7.5 mmol) and 8 mL of DMF were added to a round-bottomed flask and stirred at room temperature for 24 hours. The polymer was dissolved in THF, and excess NaN$_3$ was removed through a short neutral alumina column, followed by concentration of the solvent by rotary evaporation. Linear azide polystyrene (l-PS-N$_3$) was precipitated in methanol, obtained by suction filtration, and dried in a vacuum box at 30° C. for 24 hours (974.8 mg, yield: 81.2%).

Under nitrogen atmosphere, cyclic polymer (c-P1, 4.4 mg, 2×10$^{-3}$ mmol), l-PS-N$_3$ (150 mg, 6×10$^{-2}$ mmol), PMDETA (10.40 mg, 6×10$^{-2}$ mmol), and THF/DMF (v/v=2/1, 6 mL) into a 10 mL ampoule. CuBr (8.61 mg, 6×10² mmol) and Cu (1.9 mg, 3×10$^{-2}$ mmol) were added to the above solution. The solution was further stirred at room temperature for 24 hours. The polymer was precipitated in methanol, obtained by suction filtration, and dried in a vacuum box at 30° C. for 24 hours. The crude ring comb polymer was subjected to cyclic preparation grade SEC to remove excess l-PS-N$_3$ to obtain the ring graft polymer with high graft density (c-P1-g-PS, 31.1 mg).

Example 5: Cyclic Polymer c-PPF4VB$_{4.0k}$ was Directly Modified by Macromolecule to Form a Ring-Shaped Comb Polymer with High Graft Density (c-PPF4VB$_{4.0k}$-g-PEG)

The specific synthetic route of FIG. 2 shown is as follow,

Under nitrogen atmosphere, the cyclic polymer (c-PPF4VB$_{4.0k}$, 10 mg, 2.63×10$^{-3}$ mmol), PEG-NH$_2$ (95 mg, 4.7×10$^{-2}$ mmol), and a mixed solvent of THF/DMF (v/v=1/1, 1 mL) was added to an ampule with 5 mL, the solution was stirred at room temperature for 24 h, and then precipitated in ice ether. It was obtained by suction filtration and dried in a vacuum box at 30° C. for 24 hours to obtain the high graft density. Cyclic comb polymer (c-PPF4VB$_{4.0k}$-g-PEG) (74.6 mg).

Figure 3:
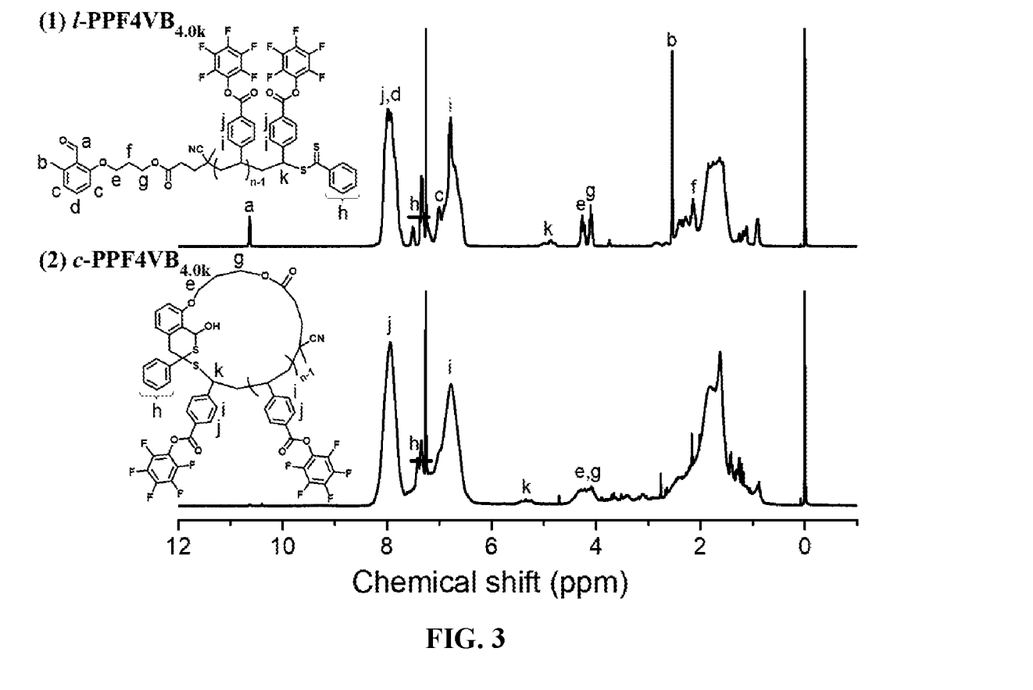
FIG. 3 is shown the NMR hydrogen spectrum of the linear poly (pentafluorophenyl 4-vinylbenzoate) (l-PPF4VB$_{4.0k}$) and cyclic poly (pentafluorophenyl 4-vinylbenzoate)(c-PPF4VB$_{4.0k}$)

FIG. 3 is shown the NMR hydrogen spectrum of the linear poly (pentafluorophenyl 4-vinylbenzoate) (l-PPF4VB$_{4.0k}$) and cyclic poly (pentafluorophenyl 4-vinylbenzoate) (c-PPF4VB$_{4.0k}$). From the figure, the peak position of the functional group at the end of the linear polymer can be seen, and the integral ratio of a/h/e/g is about 1/5/2/2, which indicates the polymerization. The substance has high terminal functionality. After cyclization, the chemical shift peak (a) of hydrogen on the aldehyde group disappeared, and the chemical shift of hydrogen (k) on the benzyl group also occurred. This aspect illustrates the synthesis of cyclic polymers.

Figure 4:
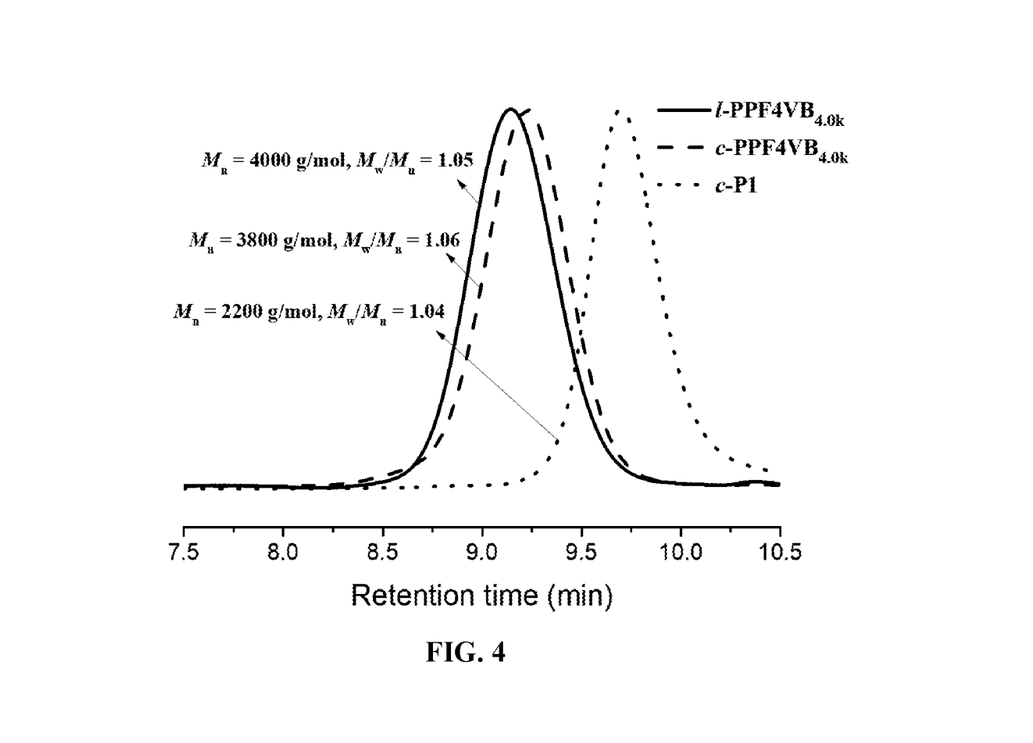
FIG. 4 is the GPC effluent curve (THF phase) of the linear polymer (Z-PPF4VB$_{4.0k}$), the cyclic polymer (c-PPF4VB$_{4.0k}$), and a functionalized cyclic polymer (c-P1)

In FIG. 4, after the ring formation, the GPC outflow curve of the cyclic polymer shifts to the low molecular weight region, which is consistent with the feature that the cyclic polymer has a smaller hydrodynamic volume than a linear precursor of the same molecular weight.

Figure 5:
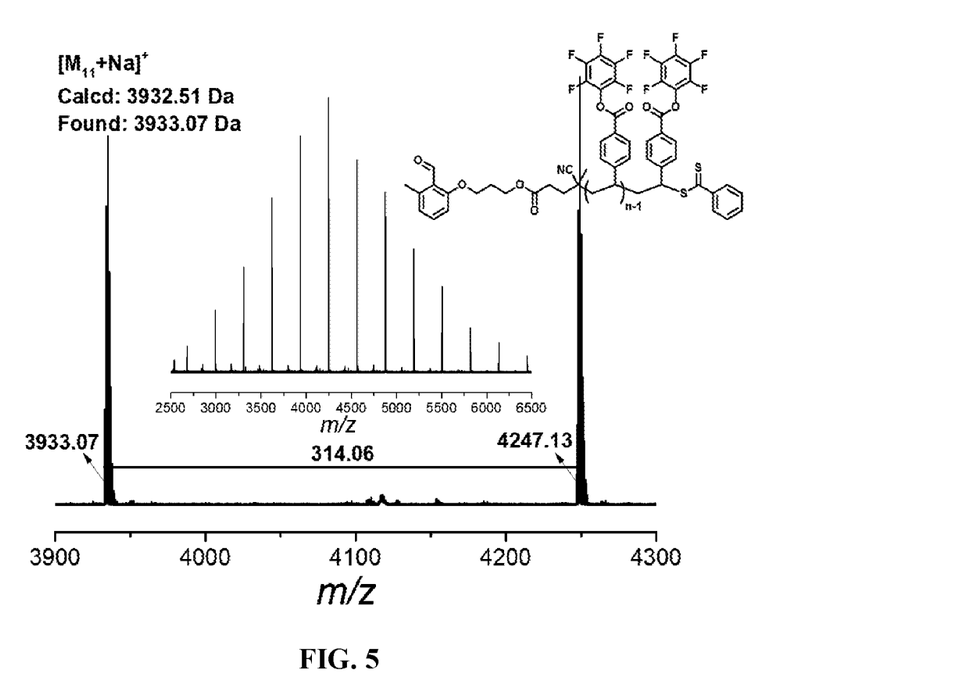
FIG. 5 is the mass spectrum of the linear polymer (l-PPF4VB$_{4.0k}$)
Figure 6:
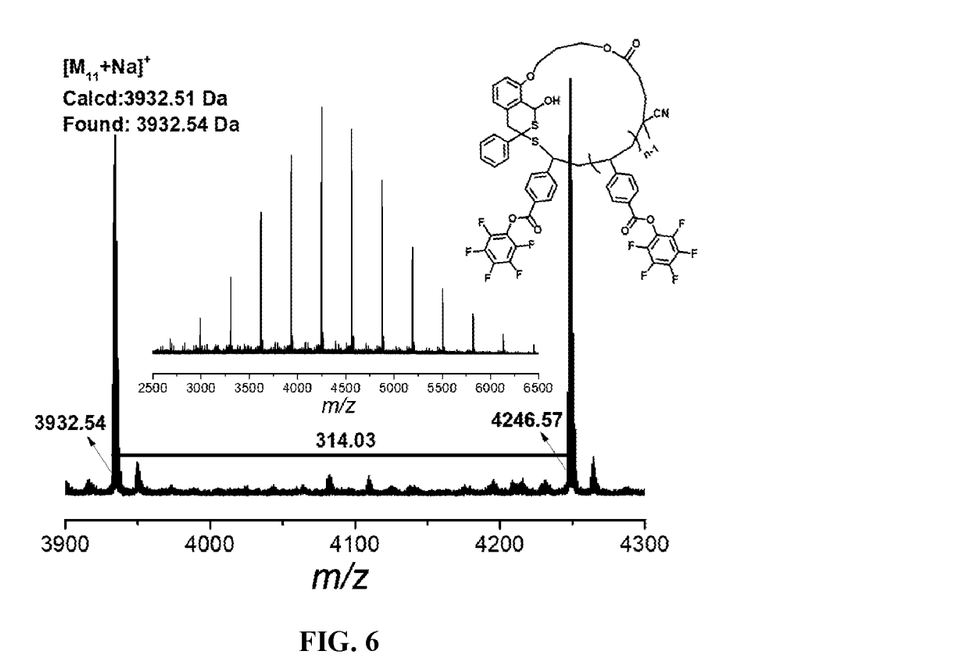
FIG. 6 is the mass spectrum of the cyclic polymer (c-PPF4VB$_{4.0k}$)

FIG. 5 is the linear polymer (l-PPF4VB$_{4.0k}$). As for the representative peak in the figure, it is the molecular weight of the polymer with 11 repeating units. The experimental value is 3933.07 Da, and the theoretical value is 3932.51 Da (±1 Da), and the peak difference between two adjacent groups is exactly the molecular weight of a repeating unit. After cyclization, the cyclic polymer has no molecular weight difference from the linear polymer, so it can be seen from FIG. 6 that the experimental value is consistent with the theoretical value, and there is no big difference from the linear polymer. Combined with NMR, GPC effluent curve and macromolecule mass spectrum analysis, the successful preparation of cyclic polymer (c-PPF4VB$_{4.0k}$) can be explained.

Figure 7:
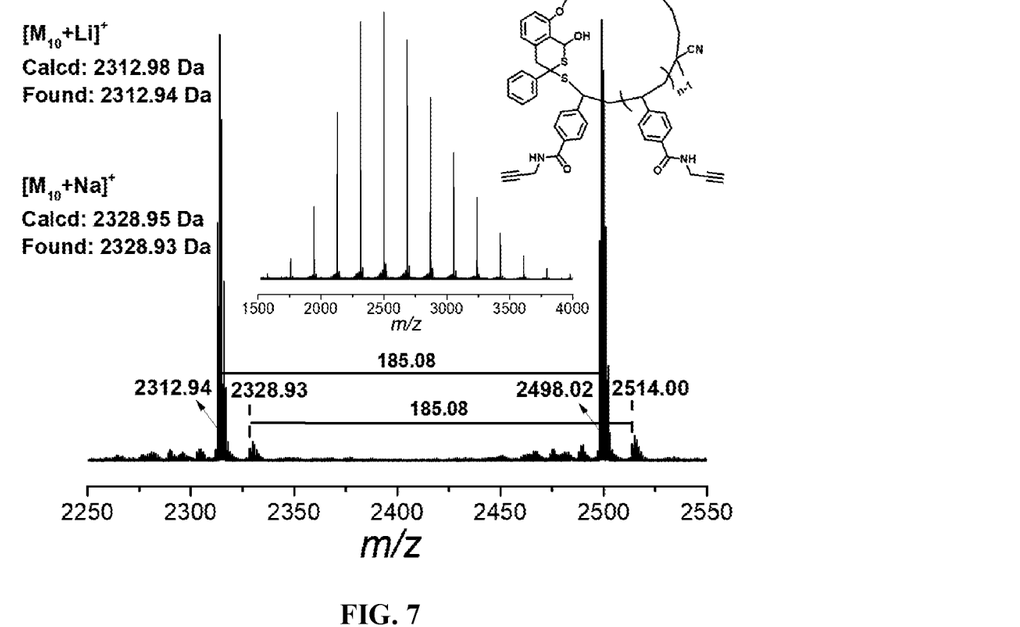
FIG. 7 is the mass spectrum of the functionalized cyclic polymer (c-P1)
Figure 8:
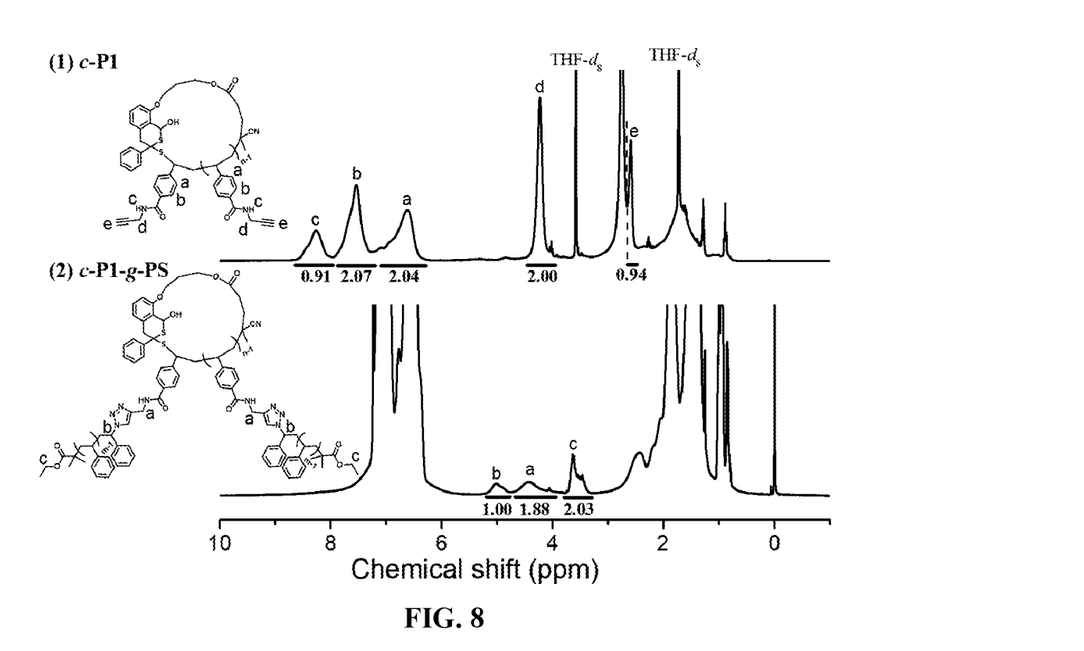
FIG. 8 is the NMR hydrogen spectrum of the functionalized cyclic polymer (c-P1) and the purified ring comb polymer (c-P1-g-PS)

FIG. 7 the mass spectrum of the functionalized cyclic polymer (c-P1). The figure shows that the experimental value is consistent with the theoretical calculation value. The peak difference between two adjacent groups is exactly the molecular weight of a repeating unit, which directly illustrates that, to improve the efficiency of transesterification, the post-modification efficiency reaches to 100%, so that a graft ratio of about 100% can be obtained. In addition, the integral of the NMR spectrum of c-P1 in FIG. 8 shows that a/b/ The c/d/e ratio is about 2/2/1/2/1, which also illustrates the high efficiency of the transesterification reaction, and the post-modification rate reaches to 100%. The NMR hydrogen spectrum of a ring-comb polymer (c-P1-g-PS) with a high graft density is also attached in FIG. 8. From the figure, the ratio of a/b/c is about 2/1/2. It is proved that the ring-comb polymer (c-P1-g-PS) with high graft density was successfully prepared by efficient click reaction.

Figure 9:
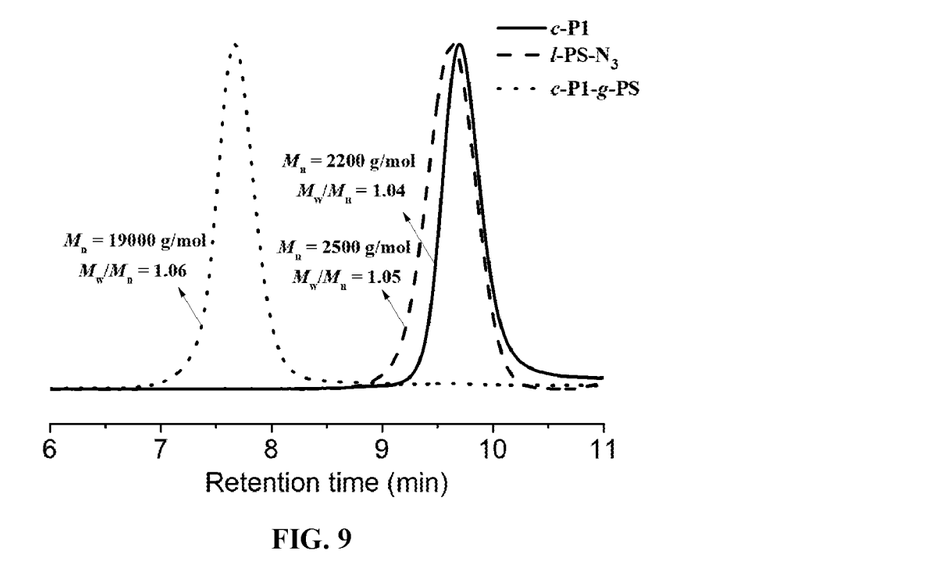
FIG. 9 is the GPC effluent curve (THF phase) of the functionalized cyclic polymer (c-P1), linear polystyrene (l-PS-N$_3$), and a purified ring comb polymer (c-P1-g-PS)

FIG. 9 is the comparison chart of the GPC effluent curve (THF phase) of the functionalized cyclic polymer (c-P1), linear polystyrene (l-PS-N$_3$), and a purified ring comb polymer (c-P1-g-PS). It can be clearly seen from the figure that the ring-comb polymer still maintains a narrow molecular weight distribution after clicking the chemical reaction, and the molecular weight distribution is controlled at 1.06.

Figure 10:
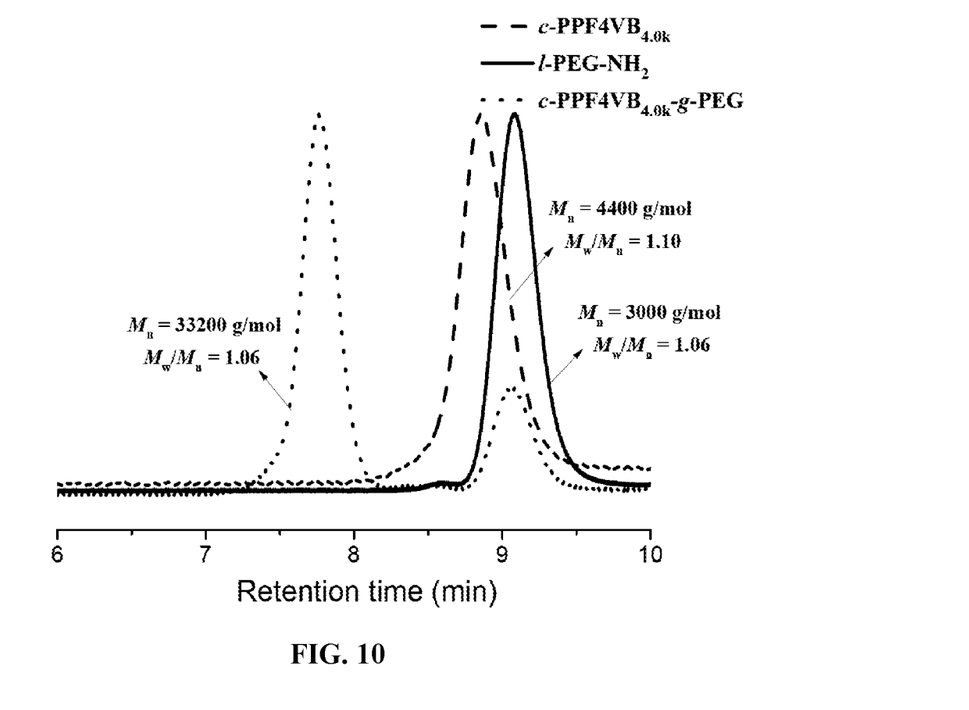
FIG. 10 is the GPC effluent curve (DMF phase e) of the cyclic polymer (l-PPF4VB$_{4.0k}$), the methoxy polyethylene glycol amine (PEG-NH$_2$), and the ring comb polymer (c-PPF4VB$_{4.0k}$-g-PEG).

FIG. 10 is the comparison chart of the GPC effluent curve (DMF phase e) of the cyclic polymer (l-PPF4VB$_{4.0k}$), the methoxy polyethylene glycol amine (PEG-NH$_2$), and the ring comb polymer (c-PPF4VB$_{4.0k}$-g-PEG). It is clearly seen that in addition to the obvious increase in molecular weight, the characteristic of narrow molecular weight distribution (1.05) is still maintained, which is similar to the former case; also from the mass spectrometry test, it can be found that the grafting rate reaches to 100%.

In the invention, prepares the linear polymer (l-PPF4VB$_{4.0k}$) at the first, and then uses the light-induced cyclization method to prepare the corresponding cyclic polymer (c-PPF4VB$_{4.0k}$), and then uses small molecule amine (propargylamine) pair After the cyclic polymer is modified to obtain a functional cyclic polymer (c-P1), the azide linear polystyrene (l-PS-N$_3$) is modified to c-P1 to prepare ring-shaped comb polymer with high graft density (c-P1-g-PS); macromolecular amines (methoxy-polyethylene glycol amine, PEG-NH$_2$) can also be used directly to cyclic polymers (c-PPF4VB$_{4.0k}$) after modification, a cyclic polymer (c-PPF4VB$_{4.0k}$-g-PEG) with high graft density is prepared.

The invention claimed is:

1. A method of preparing a high-grafting density cyclic comb shaped polymer, comprising the following steps:
   (1) preparing a linear polyformate from a formate monomer as a starting material in a first solvent, in the presence of a RAFT reagent;
   (2) converting the linear polyformate to a cyclic polyformate through a light-induced reaction under an inert gas atmosphere and in a second solvent;
   (3) reacting the cyclic polyformate with a small molecule amine to obtain a functional cyclic polymer under the inert gas atmosphere and in a third solvent; and
   (4) reacting the functional cyclic polymer with a linear azide polystyrene to obtain the high-grafting density cyclic comb-shaped polymer in the presence of pentamethyl-diethylenetriamine, copper, and a copper salt, under the inert gas atmosphere and in a fourth solvent.

2. A method of preparing a high-grafting density cyclic comb shaped polymer, comprising the following steps:
   (1) preparing a linear polyformate from a formate monomer as a starting material in a first solvent, in the presence of a RAFT reagent;
   (2) converting the linear polyformate to a cyclic polyformate through a light-induced reaction under an inert gas atmosphere and in a second solvent; and
   (3) reacting the cyclic polyformate with an amino-terminated polymer to obtain the high-grafting density cyclic comb-shaped polymer under the inert gas atmosphere and in a third solvent.

3. The method according to claim 1, wherein in step (1), a molar ratio of the formate monomer to the RAFT reagent is (50 to 150):(1 to 2); the formate monomer is pentafluorophenyl 4-vinylphenylformate; the first solvent is toluene; a reaction temperature is 80 to 120° C., and a reaction time is 4 to 10 hours.

4. The method according to claim 1, wherein in step (2), the light-induced reaction is an UV irradiation reaction for 6 to 24 hours, and an UV irradiation is generated from a low pressure mercury lamp, a medium pressure mercury lamp, or a high pressure mercury lamp; and the second solvent is dichloromethane or acetonitrile, and a volume ratio of dichloromethane and acetonitrile is (0 to 1):(2 to 4).

5. The method according to claim 1, wherein 2,3-dimethylanisole, copper sulfate pentahydrate and potassium persulfate, as starting materials, are stirred in a mixed solvent of acetonitrile and water to prepare 2-methoxy-6-methylbenzaldehyde; aluminum trichloride is added to a dimethoxymethane solution of 2-methoxy-6-methylbenzaldehyde, and stirred at room temperature overnight to obtain 2-hydroxy-6-methylbenzaldehyde; 2-hydroxy-6-methylbenzaldehyde and bromopropanol are added into a solution of potassium carbonate in N,N-dimethylformamide at 90° C. overnight, after a reaction is completed, insoluble matter is removed by filtration, and HCl is added to a filtrate to obtain 2-(3-hydroxypropoxy)-6-methylbenzaldehyde; 2-(3-hydroxypropoxy)-6-methylbenzaldehyde and 4-cyano-4-(thioben-zoylthio) valeric acid are dissolved in dichloromethane, a solution of N,N'-dicyclohexylcarbimide and 4-dimethylaminopyridine in dichloromethane is added dropwise, and a resulting reaction mixture is stirred at room temperature for 24 hours to obtain the RAFT reagent.

6. The method according to claim 1, wherein in step (3), the solvent is tetrahydrofuran, chloroform, or dichloromethane; a molar ratio of the cyclic polyformate to the small molecule amine was (1 to 2):(40 to 80); the reaction is stirred at room temperature for 6 to 24 hours; and the small molecule amine is propargylamine.

7. The method according to claim 1, wherein in step (4), a molar ratio of the functional cyclic polymer, the linear azide polystyrene, pentamethyldiethylenetriamine, the copper, and the copper salt was from (1 to 2):(20 to 40):(20 to 40):(10 to 20):(20 to 40); the fourth solvent is a mixture of tetrahydrofuran and N,N-dimethylformamide, a volume ratio of tetrahydrofuran and N,N-dimethylformamide is (2 to 4):(1 to 2); and the copper salt is cuprous bromide.

8. The method according to claim 1, wherein styrene, ethyl 2-bromoisobutyrate, CuBr$_2$, pentamethyldiethylenetriamine, ascorbic acid, and anisole, are stirred at 90° C. for 2.5 hours to obtain a polymer; the polymer, sodium azide and N,N-dimethylformamide are mixed and stirred at room temperature for 24 hours to obtain the linear azide polystyrene.

9. The method according to claim 2, wherein a molar ratio of cyclic polyformate and the amino-terminated polymer is (1 to 2):(10 to 30); and the third solvent is a mixture of tetrahydrofuran and N,N-dimethylformamide, a volume ratio of tetrahydrofuran to N,N-dimethylformamide is from (1 to 2):(1 to 2); and the amino-terminated polymer is methoxypolyethylene glycol amine.

10. The method according to claim 2, wherein in step (1), a molar ratio of the formate monomer to the RAFT reagent is (50 to 150):(1 to 2); the formate monomer is pentafluorophenyl 4-vinylphenylformate; the first solvent is toluene; a reaction temperature is 80 to 120° C., and a reaction time is 4 to 10 hours.

11. The method according to claim 2, wherein in step (2), the light-induced reaction is an UV irradiation reaction for 6 to 24 hours, and an UV irradiation is generated from a low pressure mercury lamp mercury lamp, a medium pressure mercury lamp, or a high pressure mercury lamp, preferably the low-pressure mercury lamp; and the second solvent is dichloromethane or acetonitrile, and a volume ratio of dichloromethane and acetonitrile is (0 to 1):(2 to 4).

12. The method according to claim 2, wherein 2,3-dimethylanisole, copper sulfate pentahydrate and potassium persulfate, as starting materials, are stirred in a mixed solvent of acetonitrile and water to prepare 2-methoxy-6-methylbenzaldehyde; aluminum trichloride is added to a dimethoxymethane solution of 2-methoxy-6-methylbenzaldehyde, and stirred at room temperature overnight to obtain 2-hydroxy-6-methylbenzaldehyde; 2-hydroxy-6-methylbenzaldehyde and bromopropanol are added into a solution of potassium carbonate in N,N-dimethylformamide at 90° C. overnight, after a reaction is completed, insoluble matter is removed by filtration, and HCl is added to a filtrate to obtain 2-(3-hydroxypropoxy)-6-methylbenzaldehyde; 2-(3-hydroxypropoxy)-6-methylbenzaldehyde and 4-cyano-4-(thio-ben-zoylthio) valeric acid are dissolved in dichloromethane, a solution of N,N'-dicyclohexylcarbimide and 4-dimethylaminopyridine in dichloromethane is added dropwise, and a resulting reaction mixture is stirred at room temperature for 24 hours to obtain the RAFT reagent.

\* \* \* \* \*